United States Patent
Nelson et al.

(10) Patent No.: US 8,882,369 B1
(45) Date of Patent: Nov. 11, 2014

(54) INTEGRATED GIMBAL ASSEMBLY

(71) Applicant: Rosemount Aerospace Inc., Burnsville, MN (US)

(72) Inventors: Ryan Nelson, Farmington, MN (US); Alexander Stephens, Savage, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 13/875,888

(22) Filed: May 2, 2013

(51) Int. Cl.
G03B 17/00 (2006.01)
H04N 5/225 (2006.01)
H04N 7/18 (2006.01)

(52) U.S. Cl.
CPC .............. *H04N 5/2252* (2013.01); *H04N 7/18* (2013.01)
USPC .......................................................... 396/427

(58) Field of Classification Search
CPC ............................. H04N 5/225; H04N 5/2251
USPC .......................................................... 396/427
See application file for complete search history.

(56) References Cited

U.S. PATENT DOCUMENTS

| | | | |
|---|---|---|---|
| 5,656,942 A * | 8/1997 | Watts et al. | 324/750.19 |
| 6,268,882 B1 * | 7/2001 | Elberbaum | 348/151 |
| 6,708,943 B2 | 3/2004 | Ursan et al. | |
| 7,264,220 B2 | 9/2007 | Dent et al. | |
| 7,473,040 B2 * | 1/2009 | Kenoyer et al. | 396/428 |
| 7,534,057 B2 | 5/2009 | Jones et al. | |
| 8,167,506 B2 * | 5/2012 | Martos | 396/427 |
| 2005/0041965 A1 * | 2/2005 | Morozumi | 396/427 |
| 2006/0216019 A1 * | 9/2006 | Thompson | 396/427 |
| 2008/0008467 A1 * | 1/2008 | Liu | 396/427 |
| 2008/0210025 A1 * | 9/2008 | Goossen et al. | 74/5.34 |

OTHER PUBLICATIONS

Orbex Group, Revolution in Motion, "Miniature Slip Rings", Brochure, 5 pages.
MicroE Systems, Micro Motion Absolute™ Overview, retrieved from the internet—"http://www.microesys.com/products/micro-motion-absolute" on Mar. 7, 2013.

* cited by examiner

Primary Examiner — Rodney Fuller
(74) Attorney, Agent, or Firm — Edwards Wildman Palmer LLP; Scott D. Wofsy; Joshua L. Jones

(57) ABSTRACT

A gimbal assembly including a gimbal housing having opposed first and second yoke portions dimensioned and configured to receive a surveillance device therebetween, the yoke portions defining a gimbal axis about which the surveillance device can rotate relative to the gimbal housing, and a drive assembly disposed within the first yoke portion of the gimbal housing for driving the surveillance device about the gimbal axis, the drive assembly having a connector adapted and configured to mate with and pass electrical signals to and from a corresponding connector on the surveillance device, wherein the second yoke portion is detachable from the gimbal housing to gain access to the surveillance device and the surveillance device is removably connected to the drive assembly.

17 Claims, 3 Drawing Sheets

INTEGRATED GIMBAL ASSEMBLY

BACKGROUND OF THE INVENTION

1. Field of the Invention

The subject invention relates to gimbal assembly for an electronic device, and more particularly, to a gimbal assembly for a replaceable camera or infrared sensor mounted on a fixed or mobile surveillance platform.

2. Description of Related Art

Cameras, infrared sensors and other electronic surveillance devices can be mounted and used on a variety of platforms including, for example, moving vehicles such as land vehicles, watercraft and aircraft. Many of the electronic devices employed in this manner benefit from being easily and accurately focused or pointed at a particular target or objective. Motor driven gimbal systems that include at least two perpendicular axes of rotation are often used to focus or point these electronic devices at a target for purposes of surveillance, as disclosed for example in U.S. Pat. No. 7,264,220 to Dent et al.

For a gimbal assembly containing an electronic device such as a camera or an infrared sensor on the rotating part of the gimbal, it is necessary to pass electrical signals, such as analog and/or digital video signals, to and from that electronic device. Additionally, it is required to have a drive device or interface to a drive device, such as a belt or gear, to create the rotational motion about the gimbal axes. Also, it is often necessary to have a position feedback mechanism that transmits the angular position of the rotating component to a gimbal control system.

Typically, the design of the gimbal assembly dictates that all three of these features need to be near to the axis of rotation which can cause challenges in geometric fit. It can also make it difficult to design a gimbal housing as an assembly in which the electrical component can be easily removed and replaced.

It would be beneficial to provide a single compact gimbal assembly, which allows easy removal of the electrical device from the gimbal housing, while providing the ability to readily pass electrical signals to and from that electrical device, and have a drive device or interface to a drive device to create the rotation about the gimbal axis.

The subject invention provides all of these benefits by positioning the desirable features in one assembly on one side of the gimbal housing yoke, allowing the other side of the gimbal housing yoke to be easily removable in order to replace the electrical device.

SUMMARY OF THE INVENTION

The subject invention is directed to a new and useful gimbal assembly including a gimbal housing having opposed first and second yoke portions dimensioned and configured to receive an electrical surveillance device therebetween. The yoke portions define a gimbal axis about which the electrical surveillance device can rotate relative to the gimbal housing.

A drive assembly is disposed within the first yoke portion of the gimbal housing for driving the electrical surveillance device about the gimbal axis. Furthermore, the drive assembly is adapted and configured to pass electrical signals to and from the electrical surveillance device. More particularly, the drive assembly includes a slip ring component for transferring electrical signals and power to and from the electrical surveillance device. The second yoke portion is detachable from the gimbal housing to gain access to the electrical surveillance device and the electrical surveillance device is removably connected to the drive assembly.

The drive assembly preferably includes an encoder wheel to provide feedback on the angular position of the electrical surveillance device relative to the gimbal axis of the housing. The drive assembly also includes means for interfacing with a drive motor. For example, the drive assembly can include a drive belt or gear train for interfacing with a drive motor.

The drive assembly also includes alignment pins for engaging corresponding alignment ports on the electrical surveillance device, to enable blind mounting of that device in the gimbal housing. In addition, the drive assembly includes a compressible connector for temporarily coupling with a mating connector on the electrical surveillance device.

These and other features of the integrated gimbal assembly of the subject invention and the manner in which it is employed will become more readily apparent to those having ordinary skill in the art from the following enabling description of the preferred embodiments of the subject invention taken in conjunction with the several drawings described below.

BRIEF DESCRIPTION OF THE DRAWINGS

So that those skilled in the art to which the subject invention appertains will readily understand how to make and use the integrated gimbal assembly of the subject invention without undue experimentation, preferred embodiments thereof will be described in detail herein below with reference to certain figures, wherein.

DETAILED DESCRIPTION OF PREFERRED EMBODIMENTS

Figure 1:
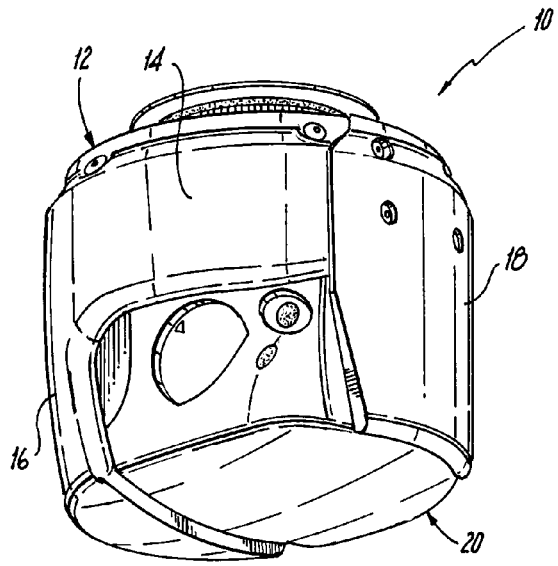
FIG. 1 is a perspective view of the integrated gimbal assembly of the subject invention which includes a gimbal housing with a detachable yoke portion for gaining ready access to a removable camera device.

Referring now to the drawings, wherein like reference numerals identify similar structural features or aspects of the subject invention, there is illustrated in FIG. 1 a gimbal assembly 10 adapted and configured for use in conjunction with a video surveillance system. For example, the gimbal assembly 10 may be employed with a land-based video surveillance system, as found for example in a home security system or a banking institution. Alternatively, the gimbal assembly 10 may be employed on a moving vehicle such as, for example, a helicopter or an unmanned aerial vehicle (UAV).

Figure 2:
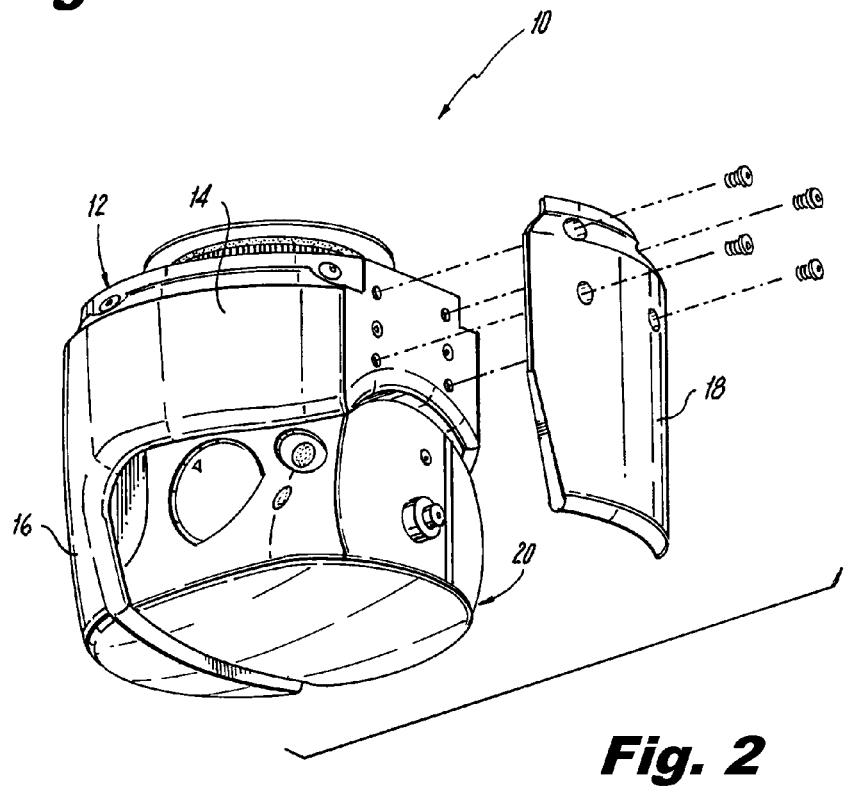
FIG. 2 is a perspective view of the integrated gimbal assembly shown in FIG. 1, with the detachable yoke portion separated from the gimbal housing.

Referring to FIG. 1, the gimbal assembly 10 includes a gimbal housing 12 having a main upper body portion 14 and opposed first and second yoke portions 16 and 18, which depend downwardly from the main body portion 14. Yoke portion 16 is affixed to the upper body portion 14 of gimbal housing 12, while yoke portion 18 is detachably connected to the upper body portion 14 of gimbal housing 12 by a plurality of threaded fasteners or an equivalent mechanical connection, as shown in FIG. 2.

The two parallel yoke portions 16 and 18 of gimbal housing 12 are adapted and configured to movably support a removable electrical device 20 there between. It is envisioned that the removable electrical device 20 can take the form of a camera, an infrared imaging device or another type of optical surveillance device known in the art. As explained in more detail below, the gimbal assembly 10 of the subject invention provides a temporary electrical connection between the fixed yoke portion 16 of the gimbal housing 12 and the electrical device 20 to facilitate the ready removal of the electrical device 20 from the gimbal housing 12.

Figures 3, 4, 5:
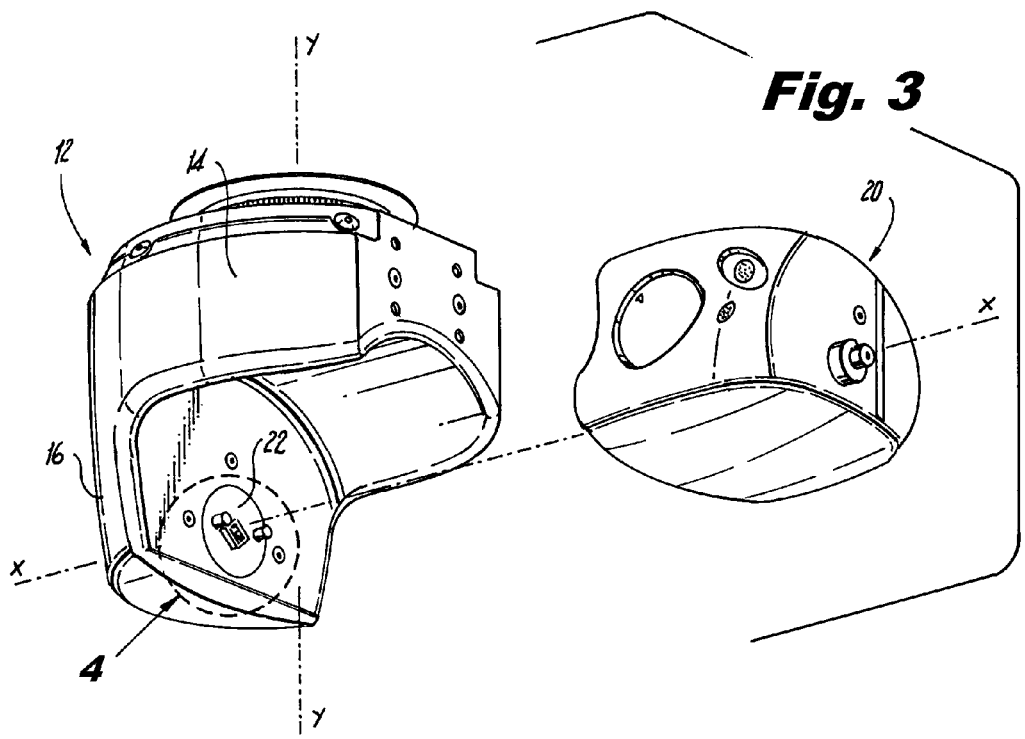
FIG. 3 is a perspective view of the integrated gimbal assembly shown in FIG. 1, with the camera device removed from the gimbal housing, and showing exterior features of the drive assembly for driving the camera device about the gimbal axis.
FIG. 4 is an enlarged front perspective view of the drive assembly located within the fixed yoke portion of the gimbal housing.
FIG. 5 is an enlarged rear perspective view of the drive assembly shown in FIG. 4.

As best seen in FIG. 3, when the second yoke portion 18 is detached from the main body portion 14 of gimbal housing 12, there is ready access to the electronic device 20. As a result, the electronic device 20 can be easily removed from the gimbal housing 12. This is advantageous for a number of reasons. For example, multiple version of an electronic device can be employed with the same gimbal assembly. That is, during daylight operation of a UAV supporting the gimbal assembly 10 of the subject invention, it may be beneficial to utilize a color day-light camera for visual surveillance of a target. Whereas, during night time operation of the same UAV, it may be beneficial to utilize an infrared sensor for visual surveillance of a target. In such a situation, the two versions of the electronic device 20 can be easily switched by detaching the second yoke portion 18 from the main body portion 14 of the gimbal housing 12 and removing the device.

Other advantages of the gimbal assembly 10 include the ability to quickly and easily replace a damaged or malfunctioning electronic device 20. Alternatively, if the gimbal housing 12 malfunctions, the electronic device 20 can be easily and quickly removed and preserved for later use in a different gimbal assembly on the same or different vehicle or platform.

With continuing reference to FIG. 3, the two parallel yoke portions 16, 18 of gimbal housing 12 define a first gimbal axis "x" about which the electrical device 20 can rotate relative to the gimbal housing 12. The "x" axis is commonly referred to as the tilt axis. The gimbal housing 12 defines a second gimbal axis "y" about which the entire gimbal housing 12 can rotate relative to the structure or platform to which it is mounted. The "y" axis is commonly referred to as the pan axis.

A drive assembly 22 is disposed within the fixed yoke portion 16 of the gimbal housing 12 for driving the electronic device 20 about the tilt axis of the gimbal housing 12. The drive assembly 22 is adapted and configured to pass electrical signals to and from the electrical device 20, including, for example, a power signal and an analog/digital video signal may be passed between the drive assembly 22 and the electrical device 20. Other electrical signals may be passed as well.

Referring to FIGS. 4 through 7, the drive assembly 22 of gimbal assembly 10 includes a main wheel member 24, preferably manufactured from a plastic material, such as, for example ABS or Delrin®. The main wheel member 24 of drive assembly 22 includes a pair of forwardly projecting blind mating alignment pins 25a, 25b adapted and configured for reception in corresponding apertures or ports provided in the housing of electronic device 20 (not shown).

The main wheel member 24 is dimensioned and configured to mechanically interact with a drive belt (not shown). More particularly, the main wheel member 24 includes a recessed engagement region 24a having teeth for mechanically engaging a drive belt. It is envisioned that the main wheel member 24 of drive assembly 22 could also be driven by a gear assembly or other mechanical drive means known in the art.

The main wheel member 24 houses a central slip ring 26, which is an electrical component commonly used in compact spaces to transfer electrical signals and power to a rotating shaft (i.e., a shaft of electronic device 20). An example of a slip ring component suitable for this purpose is the Model 318 Miniature Slip Ring manufactured by Orbex Group of Fremont, Calif. Other slip ring devices known in the art may also be employed.

Drive assembly 22 further includes a rotary encoder wheel 28 configured to provide feedback on the angular position of the electronic device 20 about the tilt axis of the gimbal housing 12, and more particularly, the angular position of the main wheel member 24 of drive assembly 22. Rotary encoders of this type acquire angular position from a pre-programmed track. By putting absolute position marks at unique locations, as soon as the motion control system passes through a small rotation, typically 4°-7°, the controller will have the absolute angular position of the device. An example of a rotary position encoder suitable for this purpose is the Micro Motion Absolute Rotary Encoder manufactured by MicroE Systems, a division of GSI Group of Bedford, Mass. Other rotary encoder devices known in the art may also be employed.

Figures 6, 7:
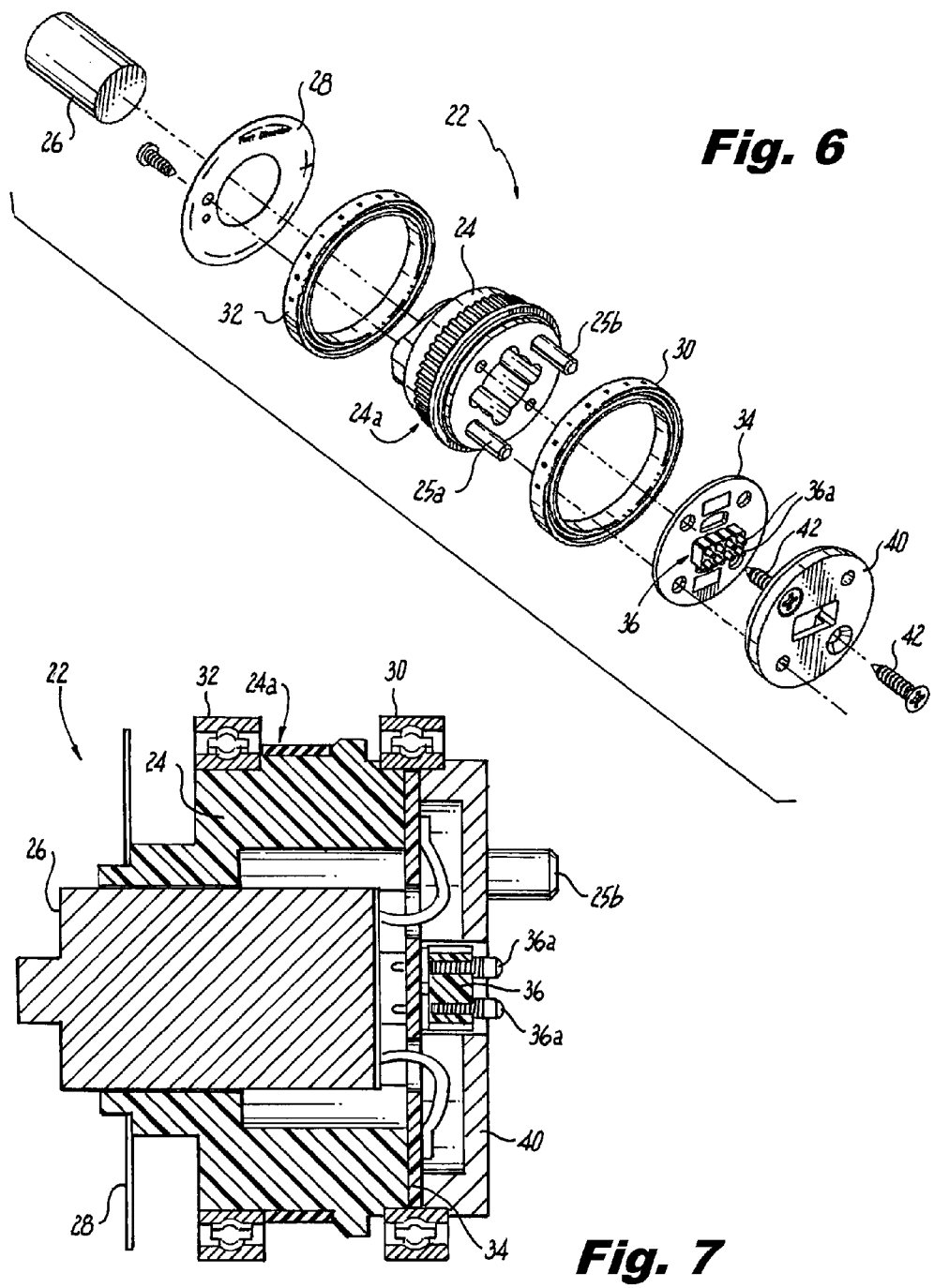
FIG. 6 is an exploded perspective view of the drive assembly of FIG. 4, with parts separated for ease of illustration.
FIG. 7 is a side elevational view in cross section taken along line 7-7 of FIG. 4 illustrating the interior components of the drive assembly.

The drive assembly 22 further includes a pair of annular bearings 30, 32 which support the main wheel member 24 for rotation within the fixed yoke portion 16 of gimbal housing 12. A printed circuit board 34 is also provided in the main wheel member 24 of drive assembly 22, and it is directly soldered to the central slip ring 26, as shown in FIG. 7. The printed circuit board 34 includes a blind mate compressible connector 36 configured to establish a temporary connection with a corresponding connector on the electronic device 20. For example, the compressible connector 36 can be a pogo pin connector or the like.

Pin connector 36 includes an array of spring-loaded pins 36a designed to make secure contact between two circuits and thereby connect them together. In this case, the two circuits to be connected by the pins 36a of connector 36 include the circuit on printed circuit board 34 and a circuit within the electronic device 20. Other temporary electronic connectors known in the art could also be employed. A face plate 40 covers the front of the main wheel member 24 to enclose and protect the printed circuit board 34. Face plate 40 is secured in place by a pair of threaded fasteners 42.

While not illustrated herein, it is envisioned and well within the scope of the subject disclosure that the gimbal assembly 10 could include a single fixed yoke portion defining the tilt axis of the electronic device 20, rather than the two parallel yoke portions 16, 18 described above. In such a case, the electronic device 20 would be readily accessible and detachably fastened to the single fixed yoke portion using a releasable fastening mechanism, so that a second detachable yoke portion would not be required to support the electronic device 20 within the gimbal housing 12. For example, a snap-in fastener or a bayonet-type coupling could be employed to releasably fasten the electronic device 20 to the single yoke portion of the gimbal housing 12.

It is further envisioned that the concept of a detachable surveillance device supported for rotation about an integrated axis could be employed in the pan axis of a one or two axis gimbal assembly, as well as the tilt axis as described herein, while remaining true to the spirit and scope of the subject disclosure.

While the integrated gimbal assembly of the subject invention has been shown and described with reference to a preferred embodiment, those skilled in the art will readily appreciate that various changes and/or modifications may be made thereto without departing from the spirit and scope of the subject invention as defined by the appended claims.

What is claimed is:

1. A gimbal assembly comprising:
   a) a gimbal housing having opposed first and second yoke portions dimensioned and configured to receive an electrical device therebetween, the yoke portions defining a gimbal axis about which the electrical device can rotate relative to the gimbal housing; and
   b) a drive assembly disposed within the first yoke portion of the gimbal housing for driving the electrical device about the gimbal axis, the drive assembly having a main wheel member including:
      a pair of forwardly projecting alignment pins for engaging corresponding alignment ports on the electrical device;
      a slip ring adapted and configured to pass electrical signals to and from the electrical device; and
      an encoder wheel disposed circumferentially around the slip ring to provide feedback on the angular position of the electrical device relative to the gimbal axis, wherein the second yoke portion is detachable from the gimbal housing to gain access to the electrical device.

2. A gimbal assembly as recited in claim 1, where the electrical device is removably connected to the drive assembly.

3. A gimbal assembly as recited in claim 2, wherein the drive assembly includes a compressible connector for temporarily coupling with a mating connector on the electrical device.

4. A gimbal assembly as recited in claim 1, wherein the electrical device is a camera device.

5. A gimbal assembly as recited in claim 1, wherein the electrical device is an infrared sensing device.

6. A gimbal assembly as recited in claim 1, wherein the drive assembly includes means for interfacing with a drive motor.

7. A gimbal assembly as recited in claim 1, wherein the gimbal housing is adapted and configured for rotation about a main axis extending perpendicular to the gimbal axis.

8. A gimbal assembly as recited in claim 1, wherein the main wheel member includes a printed circuit board coupled to the slip ring, the printed circuit board including a compressible connector configured to establish a temporary connection with a corresponding connector on the electronic device.

9. A gimbal assembly as recited in claim 8, wherein an array of spring-loaded pins included on the compressible connector electronically connects the printed circuit board to a circuit with the electronic device.

10. A gimbal assembly comprising:
    a) a gimbal housing having a yoke portion dimensioned and configured to receive a surveillance device, the yoke portion defining a gimbal axis about which the surveillance device can rotate relative to the gimbal housing; and
    b) a drive assembly disposed within the yoke portion of the gimbal housing for driving the surveillance device about the gimbal axis, the drive assembly including:
       a slip ring component adapted and configured to pass electrical signals to and from the surveillance device; and
       an encoder wheel disposed circumferentially around the slip ring to provide feedback on the angular position of the electrical device relative to the gimbal axis, wherein the surveillance device is removably connected to the drive assembly.

11. A gimbal assembly as recited in claim 10, wherein the drive assembly includes means for interfacing with a drive motor.

12. A gimbal assembly as recited in claim 10, wherein the drive assembly includes a compressible connector for temporarily coupling with a mating connector on the surveillance device.

13. A gimbal assembly as recited in claim 10, wherein the drive assembly includes alignment pins for engaging corresponding alignment ports on the surveillance device.

14. A gimbal assembly as recited in claim 10, wherein the gimbal housing is adapted and configured for rotation about a main axis extending perpendicular to the gimbal axis.

15. A gimbal assembly comprising:
    a) a gimbal housing having opposed first and second yoke portions dimensioned and configured to receive a surveillance device therebetween, the yoke portions defining a gimbal axis about which the surveillance device can rotate relative to the gimbal housing; and
    b) a drive assembly disposed within the first yoke portion of the gimbal housing for driving the surveillance device about the gimbal axis, the drive assembly including:
       a slip ring component adapted and configured to pass electrical signals to and from the surveillance device; and
       an encoder wheel disposed circumferentially around the slip ring to provide feedback on the angular position of the electrical device relative to the gimbal axis, wherein the second yoke portion is detachable from the gimbal housing to gain access to the surveillance device and the surveillance device is removably connected to the drive assembly by a compressible connector array.

16. A gimbal assembly as recited in claim 15, wherein the surveillance device is a camera device.

17. A gimbal assembly as recited in claim 15, wherein the surveillance device is an infrared sensing device.

* * * * *